United States Patent Office 2,694,667
Patented Nov. 16, 1954

2,694,667

METHOD OF RECOVERING VITAMIN B$_{12}$ MATERIAL

Allen Spencer Phelps, Orangeburg, N. Y., Siegfried A. Muller, Westwood, N. J., and Jerry Robert D. McCormick, New City, N. Y., assignors to American Cyanamid Company, New York, N. Y., a corporation of Maine No Drawing. Application February 23, 1952, Serial No. 273,151

7 Claims. (Cl. 167—81)

This invention relates to the recovery and purification of vitamin materials and more particularly to the recovery and purification of materials having vitamin B12 activity.

The utility of vitamin B12 materials, for instance vitamin B12 and vitamin B12$b$, for the treatment of certain dietary deficiencies is now well established. It is also well known that there are many suitable sources from which such vitamin materials can be recovered. For instance, they can be obtained from liver concentrates, fermentation liquors that have supported the growth of various microorganisms such as *Streptomyces olivaceus, Streptomyces aureofaciens, Streptomyces rimosus,* and *Eremothecium ashbyii*, or from many other sources. It has recently been discovered that sewage sludge is relatively rich in vitamin B12 materials and such sludge constitutes an excellent source from which vitamin B12 materials can be extracted.

While the exact chemical formula of the vitamin B12 materials is not known, all are believed to be cobalt coordination complexes and it is known that all are so similar that a recovery method suitable for the recovery of one is generally suitable for the recovery of all. Therefore in this specification and claims, no distinction will be made between the various vitamin B12 substances and all will be referred to collectively as vitamin B12 material.

As mentioned above, there are many known sources of vitamin B12 material. There is, however, no known naturally occurring concentrated source and in each instance a relatively small amount of vitamin B12 material must be separated from a large amount of impurities. As a result, vitamin B12 purification is always a complicated procedure involving a great many difficulties. One procedure which has been employed to some extent for the purification or recovery of vitamin B12 materials comprises extracting a source of said materials with a selective solvent, or in other words, extracting with a solvent in which the vitamin B12 material is highly soluble but in which the impurities are relatively insoluble. The main disadvantage of such a purification procedure has in the past been that solvents could not be found with the required high specificity for vitamin materials which had at the same time sufficiently high solvent power for vitamin B12 to result in the recovery of a large percentage of the vitamin material. The new process of this invention overcomes the above difficulties by employing a solvent with a high specificity for vitamin B12 substances, which solvent at the same time results in a good recovery of the vitamin material.

According to the new process of this invention a solid source of impure vitamin B12 material is contacted with a selective solvent comprising an aliphatic halohydrin selected from the group consisting of bromohydrins and chlorohydrins, said halohydrin having from 2 to 4 carbon atoms inclusive and having a hydroxy substituted carbon atom adjacent to a halogen substituted carbon atom. Halohydrins of the above class may be illustrated by the following specific examples: ethylene chlorohydrin, ethylene bromohydrin, 2-chloro-1-propanol, 1-chloro-2-propanol, 1-chloro-2-butanol, alpha-beta-glycerol dichlorohydrin, alpha,gamma-glycerol dichlorohydrin, and glycerol monochlorohydrin. The above are for illustrative purposes only and other bromohydrins or chlorohydrins having a halogen substituted carbon atom adjacent to a hydroxy substituted carbon atom and having from 2 to 4 carbon atoms inclusive, are satisfactory. Commercial mixtures of the above types of halohydrins are also satisfactory. For instance, commercial mixtures of the 1,2-propylene chlorohydrins and of the glycerol dichlorohydrins are quite satisfactory.

Practically any solid source of vitamin B12 material can be satisfactorily extracted by the new process of this invention. For instance, a dry liver concentrate or liver cake may be employed as a source of vitamin B12 material, or sewage sludge can constitute a suitable source of the vitamin material. Other suitable sources include filter cakes obtained from fermentation liquors which have supported the growth of microorganisms, and adsorbent materials having vitamin B12 substances adsorbed thereon. In vitamin B12 purification, it is quite common to treat a solution of the vitamin material with an adsorbent material such as activated charcoal or magnesium silicate. Such an adsorbent substance having vitamin B12 materials adsorbed thereon constitutes an excellent solid source of vitamin B12 material which can suitably be extracted according to the new process of this invention. In other words, the new process of this invention can be employed to extract vitamin B12 materials from any solid source ordinarily encountered in vitamin B12 purification. Many of the halohydrin solvents can also be employed in liquid-liquid extraction of aqueous vitamin B12 solutions but this constitutes the subject matter of copending application, S. N. 273,153 filed concurrently herewith.

The procedure of the new process of this invention comprises simply bringing the solid source of vitamin B12 material into intimate contact with the halohydrin solvent, separating the insoluble materials from the halohydrin solvent and recovering the vitamin B12 material from the resulting halohydrin solution. Intimate contact of the solid source of vitamin B12 material and the halohydrin solvent can be effected by any solid-liquid extraction procedure. For instance, the material to be extracted can be placed in a column and the selective solvent allowed to circulate repeatedly through the source of vitamin B12 material, or a counter-current system of extraction can be employed where the solid source of vitamin B12 material is allowed to settle slowly through a slowly rising volume of selective solvent. In small scale operation a preferred procedure comprises simply forming a dispersion of the solid source of vitamin B12 material in the selective solvent so that intimate contact is obtained.

Separation of the insoluble residue of impurities from the halohydrin solution of vitamin material, resulting from the extraction of a solid source of vitamin with a halohydrin solvent, can be effected by any of the usual methods for separating solids from liquids. For instance, as indicated above, decantation can be readily employed in most instances, or if desired, filtration may be used. In small operation where a fine dispersion of the solid source of vitamin B12 material is formed in the organic selective solvent, it is quite frequently advantageous to employ a combination of methods such as centrifugation and filtration.

The vitamin B12 material can be recovered from the halohydrin solution thereof by any of several suitable methods. A method of general applicability comprises diluting the halohydrin solvent with from about 4 to 12 volumes of a liquid which is miscible with the halohydrin, but which has substantially no solvent power for the vitamin B12 material and then extracting the resulting mixture with from about 1 to 4 volumes of water. Suitable organic liquids for this purpose may be illustrated by the following: benzene, ether, chloroform, higher petroleum ethers and acetone. Another method which can be employed, in most instances, for the separation of the vitamin B12 material comprises solvent evaporation. With the higher halohydrins more advantageous results are usually obtained if the solvent evaporation is done in a vacuum. In most instances where this method is employed, the solution should be relatively free from strong bases or acids, since otherwise, as the evaporation progresses, the residue may become increasingly acidic or basic and this will result in a poor recovery.

The halohydrin solvents may be employed, in the new process of this invention as the only solvent, or they may be employed in combination with other known solvents for vitamin B12 materials. For instance the water-miscible chlorohydrins, as illustrated by ethylene chlorohydrin and the 1,2-propylene chlorohydrins, can be employed in combination with an aqueous solvent and the degree of recovery as well as the selectivity obtainable with the combined solvent is high as compared to water alone. This may be illustrated by the fact that the recovery of vitamin B12 material from alkaline aureomycin cake by water extraction is generally in the neighborhood of 75%, but with 50% aqueous 1,2-propylene chlorohydrin (commercial mixture of 1-chloro-2-propanol and 2-chloro-1-propanol) the yield is usually above 90%. The extraction of a magnesol alkaline cake with water alone gives only about a 25% recovery whereas a 50% aqueous solution of 1,2-propylene chlorohydrin (commercial mixture) gives a recovery of about 92%. As little as 10% halohydrin added to an aqueous solvent adds materially to the solvent power and selectivity of the aqueous solvent.

The new process of this invention has several advantages over prior art procedures. For instance the halohydrin solvents are highly selective and this results in obtaining the vitamin B12 material in a highly purified form; and the halohydrin solvents have a high solvent power for vitamin B12 materials which results in a greater degree of recovery. These advantages make for a simple and efficient process which can be employed with a minimum of expensive equipment.

The new process has an additional advantage when the selective solvent employed is an aqueous solution of 1-chloro-2-propanol, 2-chloro-1-propanol, or a mixture of the 1,2-propylene chlorohydrins. While these solvents are water-miscible, they are brine-immiscible, and by adding an inorganic salt such as sodium chloride to the aqueous mixture, a separation into two phases can be obtained. This results in a high degree of purification since many of the water-soluble impurities which were extracted by the chlorohydrin solvent remain in the aqueous phase, while the vitamin B12 activity is almost completely in the organic phase. An additional purification from water-soluble impurities can then be obtained by washing the chlorohydrin solution of vitamin B12 material with additional sodium chloride brine. By such a procedure a higher degree of purification is obtained than could be obtained by a simple extraction with an organic selective solvent.

The quantity of halohydrin solvent employed may be varied within wide limits. Of course, sufficient solvent should be employed to dissolve substantially all of the vitamin B12 material, and, in fact, more advantageous results can usually be obtained by employing a considerable excess over this minimum quantity since if only the minimum amount of solvent is used, a relatively large percent of the solvent is lost by absorption in the insoluble material. The upper limit as to the quantity of the solvent employed is dictated mainly by convenience and economy, although if a very large excess of solvent is employed it results in a less efficient process since some of the impurities are almost always soluble to some extent in the halohydrin solvents. As a general rule a weight of solvent equal to from about 1 to 100 times the weight of the solid matter to be extracted, depending upon the percentage of vitamin B12 material in the solid source, will be found to be most advantageous. Obviously as the concentration of vitamin B12 material in the solid source decreases, the amount of halohydrin solvent per unit weight of material to be extracted should be increased for optimum results.

The time required for reasonably complete extraction depends upon a number of variables. However, the most important factor to be considered is the degree of contact obtained. If a very high degree of contact is obtained, such as that obtained by a fine dispersion of the solid material in the halohydrin solvent, complete extraction is obtained in a very few minutes, but if the degree of contact is slight, such as might be obtained by washing a filter cake, extraction should be maintained for a longer period.

It is an advantage of the new process of this invention that extractions can be performed within a wide range of temperatures, for instance from the solidification temperature of the halohydrin solvent up to about 100° C. However, since vitamin B12 is increasingly unstable in the presence of halohydrins at higher temperatures, more satisfactory results are usually obtained if temperatures below about 60° C. are employed. On the other hand, it is seldom, if ever, advantageous to employ temperatures below about 0° C. The preferred temperature range is from about 15° C. to 30° C.

If the new halohydrin solvents are employed in combination with an aqueous solvent, more advantageous results can be obtained with some measure of pH control. Since vitamin B12 materials are unstable in aqueous solution at pH's below about 1.0 and at pH's above about 11 or 12, the extractions employing such a mixture of solvents should be performed within this range. An additional reason for maintaining the hydrogen ion concentration of the halohydrin mixture at a pH below about pH 11 is that the halohydrin solvents tend to decompose at pH's above this figure. It has been found that a mixture of aqueous solvent and halohydrin solvent is more selective at hydrogen ion concentrations in the range of pH 7 to pH 10, and the greatest degree of purification can be obtained at hydrogen ion concentrations within this range. On the other hand, the combined solvent is usually more efficient at hydrogen ion concentrations in the range of pH 1 to pH 4 and greater recoveries can be effected at these lower hydrogen ion concentrations.

The invention will be more specifically illustrated by the following examples in which all parts are by weight unless otherwise indicated.

*Example I*

Ten grams of "Magnesol" adsorbent (magnesium silicate) was added to 1.0 liter of aureomycin mash adjusted to pH 8.5 and the solids filtered. This filter cake contained essentially all the aureomycin and essentially all the vitamin B12 activity. The aureomycin was extracted by slurrying the solid twice with 2 volumes of n-butanol at pH 1.5. The spent cake was then dried in vacuo. Ten grams of this cake, assaying 8.4 gammas of B12 per gram, was extracted twice with 50 ml. of 50% (by volume) aqueous 1,2-propylene chlorohydrin (commercial mixture of 1-chloro-2-propanol and 2-chloro-1-propanol) adjusted to pH 8.5 with aqueous ammonium hydroxide. The combined extracts contained 79 gammas of vitamin B12. (A control extraction using undiluted 1,2-propylene chlorohydrin gave a yield of 50 gammas of B12.) The combined extracts were brought to a neutral pH and sodium chloride added until two phases were obtained. The organic phase was separated and washed with an equal volume of sodium chloride brine to remove additional water-soluble impurities. The vitamin activity was then recovered from the propylene chlorohydrin solution by solvent evaporation in vacuo.

*Example II*

One liter of aureomycin mash containing 425 gammas of B12 was filtered at mash pH. The filter cake, containing 418 gammas of B12, was extracted twice with a total of 250 ml. of 1,2-propylene chlorohydrin (commercial mixture of 1-chloro-2-propanol and 2-chloro-1-propanol). The combined extracts contained 496 gammas of B12 activity according to assay. The vitamin B12 material was recovered from the propylene chlorohydrin solution as a purified aqueous solution by dilution with approximately 10 volumes of benzene followed by extraction with one volume of water.

In place of the mixture of 1,2-propylene chlorohydrins of this example, one can employ the 1,2-propylene chlorohydrins individually or can substitute other halohydrins with satisfactory results. For instance, an equal volume of 1-bromo-2-propanol, 2-chloro-1-butanol, 1-chloro-2-propanol, 2-chloro-1-propanol, alpha-beta-glycerol dichlorohydrin or alpha,gamma-glycerol dichlorohydrin, can be substituted with satisfactory results for the mixture of 1,2-propylene chlorohydrins employed in this example.

*Example III*

One liter of aureomycin mash containing 700 gammas of B12 was filtered at mash pH. The filter cake, containing 685 gammas of B12, was extracted twice with a total of 350 ml. of 50% (by volume) aqueous 1,2-propylene chlorohydrin (commercial mixture) at pH 1.3. The combined extracts contained 582 gammas of B12 according to assay.

To the chlorohydrin-water solution of vitamin B12 material there was added 10% by weight of sodium chloride and the resulting organic phase separated from the aqueous phase by centrifugation. The organic phase was diluted with approximately 10 volumes of benzene and the vitamin B12 activity recovered by extraction into one volume of water.

*Example IV*

One-half liter of aureomycin mash containing 363 gammas of B12 was filtered at mash pH. The filter cake, containing 352 gammas of B12, was extracted twice with a total of 175 ml. of 50% (by volume) aqueous ethylene chlorohydrin at pH 1.2. The combined extracts contained 291 gammas of B12 according to assay. The extracts were brought to a neutral pH and the vitamin B12 material recovered by vacuum distillation of the solvent.

We claim:
1. A method of recovering vitamin B12 material from a mixture of said material and solid impurities which comprises contacting the solid mixture with a selective solvent for vitamin B12 material, said solvent comprising a halohydrin selected from the group consisting of bromohydrins and chlorohydrins having from 2 to 4 carbon atoms inclusive and having a hydroxy substituted carbon atom adjacent to a halogen substituted carbon atom, separating the insoluble material from said selective solvent and recovering vitamin B12 material from the resulting halohydrin solution.

2. The method of claim 1 where said selective solvent comprises ethylene chlorohydrin.

3. The method of claim 1 where said selective solvent comprises 1-chloro-2-propanol.

4. The method of claim 1 where said selective solvent comprises 2-chloro-1-propanol.

5. The method of claim 1 where said selective solvent comprises 1-bromo-2-propanol.

6. The method of claim 1 where said selective solvent comprises alpha,beta-glycerol dichlorohydrin.

7. A method of recovering vitamin B12 material from a mixture of said material and solid impurities which comprises contacting the solid mixture with a selective solvent for vitamin B12 material, said selective solvent comprising an aqueous solution of a water-miscible halohydrin containing from about 99% to 10% halohydrin, said halohydrin being selected from the group consisting of bromohydrins and chlorohydrins having from 2 to 4 carbon atoms inclusive and having a hydroxy substituted carbon atom adjacent to a halogen substituted carbon atom, said contact being effected at a temperature of from about 0° C. to 60° C., and said aqueous solution of halohydrin having a pH of from about pH 1 to pH 11; separating the insoluble material from said selective solvent and recovering vitamin B12 material from the resulting halohydrin solution.

References Cited in the file of this patent

UNITED STATES PATENTS

| Number | Name | Date |
|---|---|---|
| 2,582,589 | Fricke | Jan. 15, 1952 |
| 2,595,159 | Meyer | Apr. 29, 1952 |
| 2,652,357 | Ford | Sept. 15, 1953 |

OTHER REFERENCES

Merck Index, 5th edition (1940), pages 224, 457.
Zucker: Vitamins and Hormones, vol. VIII (1950), pages 8 and 9.
Jackson: Jour. of the Amer. Chemical Soc., vol. 73, January 1951, pages 337 to 341.